US009781184B2

(12) United States Patent
Johnston et al.

(10) Patent No.: US 9,781,184 B2
(45) Date of Patent: *Oct. 3, 2017

(54) METHOD AND APPARATUS FOR DISTRIBUTING MEDIA

(71) Applicant: AT&T Intellectual Property I, LP, Atlanta, GA (US)

(72) Inventors: Robert Johnston, Atlanta, GA (US); Larry Kennedy, Lawrence, KS (US); Kirk Kingsmill, Duluth, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/264,901

(22) Filed: Apr. 29, 2014

(65) Prior Publication Data

US 2014/0237535 A1   Aug. 21, 2014

Related U.S. Application Data

(63) Continuation of application No. 12/394,674, filed on Feb. 27, 2009, now Pat. No. 8,752,097.

(51) Int. Cl.
| | |
|---|---|
| *H04L 29/06* | (2006.01) |
| *H04N 21/234* | (2011.01) |
| *H04N 7/173* | (2011.01) |
| *H04N 21/2343* | (2011.01) |
| *H04N 21/61* | (2011.01) |
| *H04N 21/643* | (2011.01) |

(52) U.S. Cl.
CPC ......... *H04L 65/60* (2013.01); *H04N 7/17318* (2013.01); *H04N 21/234* (2013.01); *H04N 21/23439* (2013.01); *H04N 21/234309* (2013.01); *H04N 21/6125* (2013.01); *H04N 21/64322* (2013.01)

(58) Field of Classification Search
CPC .................. H04L 65/60; H04N 21/234; H04N 21/234309; H04N 21/23439; H04N 21/6125; H04N 21/64322; H04N 7/17318
See application file for complete search history.

(56) References Cited

U.S. PATENT DOCUMENTS

| | | | | |
|---|---|---|---|---|
| 7,443,797 | B2 * | 10/2008 | Cheung | ................. H04L 1/0006 348/E7.071 |
| 7,970,966 | B1 | 6/2011 | Hobbs | |
| 8,074,255 | B2 | 12/2011 | Thornton | |

(Continued)

*Primary Examiner* — Rong Le
(74) *Attorney, Agent, or Firm* — Guntin & Gust, PLC; Jay H. Anderson

(57) ABSTRACT

A system that incorporates teachings of the present disclosure may include, for example, a media distribution device having a support structure adapted for removably receiving a server module, a plurality of encoders, and an Internet Protocol (IP) router module; and a bus adapted for placing the server module, the plurality of video encoders, and the IP router module in communication with each other, where the server module is adapted to receive media content, where the plurality of video encoders is adapted to generate a plurality of encoded media contents from the media content and the video encoders generate the encoded media contents in temporal proximity to each other, where the IP router module is adapted to distribute the plurality of encoded media contents over an IP network. Other embodiments are disclosed.

20 Claims, 5 Drawing Sheets

(56) References Cited

U.S. PATENT DOCUMENTS

| | | |
|---|---|---|
| 2005/0149654 A1 | 7/2005 | Holloway |
| 2005/0243922 A1 | 11/2005 | Magee |
| 2006/0117371 A1 | 6/2006 | Margulis |
| 2006/0171689 A1* | 8/2006 | Smith ................ H04N 5/76 386/231 |
| 2008/0022339 A1 | 1/2008 | Montreuil |
| 2008/0282304 A1 | 11/2008 | Fann et al. |
| 2009/0249405 A1* | 10/2009 | Karaoguz .......... H04N 7/17318 725/62 |
| 2010/0180299 A1 | 7/2010 | Girard |
| 2011/0214148 A1* | 9/2011 | Gossweiler, III .... H04N 21/235 725/46 |
| 2011/0247043 A1* | 10/2011 | Bar ................ H04N 21/23439 725/109 |

\* cited by examiner

400

US 9,781,184 B2

METHOD AND APPARATUS FOR DISTRIBUTING MEDIA

CROSS-REFERENCE TO RELATED APPLICATIONS

This application is a Continuation of and claims priority to U.S. patent application Ser. No. 12/394,674. The contents of each of the foregoing is/are hereby incorporated by reference into this application as if set forth herein in full.

FIELD OF THE DISCLOSURE

The present disclosure relates generally to communication systems and more specifically to a method and apparatus for distributing media.

BACKGROUND OF THE DISCLOSURE

Often when a broadcaster, content originator, or video service provider is required to distribute content there is a need for a major element deployment to support the most basic offering. Video circuits are utilized that consist of dark fiber or other dedicated transport, which are expensive and often difficult to obtain for longer cross country or global deployments.

DETAILED DESCRIPTION OF THE DRAWINGS

Figure 1:
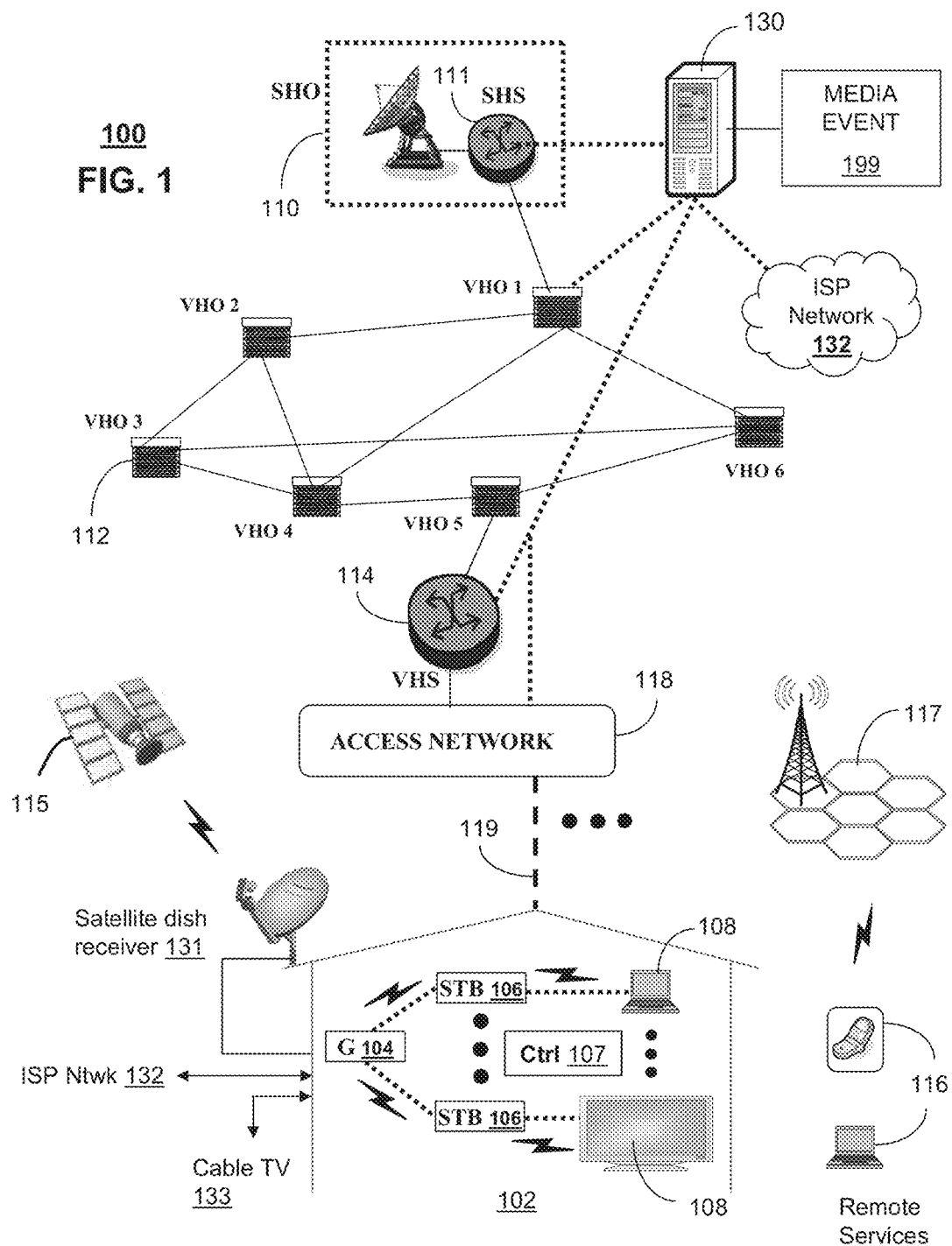
FIG. 1 depicts an illustrative embodiment of a communication system that provides media services.

One embodiment of the present disclosure can entail a computer-readable storage medium operating in a mobile distribution device where the storage medium is encoded with computer instructions for receiving media content at a server module that is removably connectable with the mobile distribution device and the media content is captured at an event that is in proximity to the mobile distribution device, transmitting from the server module a first control signal for generating a plurality of encoded media contents from the media content using a plurality of video encoders that are each removably connectable with the mobile distribution device and the video encoders generate the encoded media contents in temporal proximity to each other, and transmitting from the server module a second control signal for distributing the plurality of encoded media contents over an Internet Protocol (IP) network using an IP router module and an Ethernet switch module, where the IP router module and the Ethernet switch module are each removably connectable with the mobile distribution device.

Another embodiment of the present disclosure can entail a media distribution device comprising a support structure adapted for removably receiving a server module, a plurality of encoders, and an Internet Protocol (IP) router module; and a bus adapted for placing the server module, the plurality of video encoders, and the IP router module in communication with each other, where the server module is adapted to receive media content, where the plurality of video encoders is adapted to generate a plurality of encoded media contents from the media content and the video encoders generate the encoded media contents in temporal proximity to each other, where the IP router module is adapted to distribute the plurality of encoded media contents over an IP network.

Yet another embodiment of the present disclosure can entail a server comprising a connection structure for removably connecting the server with a chassis and for placing the server in communication with a plurality of other servers that are removably connected with the chassis, and a controller adapted to receive media content, where a plurality of encoded media contents are generated in parallel from the media content using video encoders of the other servers, and where the plurality of encoded media contents is distributed over an Internet Protocol (IP) network.

Yet another embodiment of the present disclosure can entail a server comprising a connection structure for removably connecting the server with a chassis and for placing the server in communication with one or more other servers that are removably connected with the chassis, and a controller adapted to distribute a plurality of encoded media contents over an Internet Protocol (IP) network, where the plurality of encoded media contents are generated in parallel from media content using video encoders of the other servers and where the media content is received by a video server of the other servers.

Yet another embodiment of the present disclosure can entail a method, comprising positioning a mobile distribution device in proximity to a media event; and distributing a plurality of encoded media contents over an Internet Protocol (IP) network using an IP router module, wherein media content is captured from the media event, wherein the plurality of encoded media contents is generated in parallel from the media content using a plurality of video encoders that are each removably connected with the mobile distribution device, and wherein the media content is received at a server module that is removably connected with the mobile distribution device.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a media distribution device. In one embodiment, the distribution device 130 can be a mobile device capable of being positioned in proximity to a media event 199, such as a sports event, concert, studio and so forth. The mobility of the media distribution device 130 can be achieved in a number of ways, such as being positioned in a media truck and so forth. Although the present disclosure also contemplates the device 130 being a fixed device.

The media distribution device 130 can have a plurality of modules or servers that allow for receiving of the media content, encoding the media content into various desired formats, and distribution of the encoded media content over an IP network infrastructure to which the media distribution device can be operably coupled.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services. For instance, communication system 100 can employing an IP Multimedia Subsystem (IMS) network architecture to facilitate the combined services of circuit-switched and packet-switched systems for delivery of the media content from the computing devices 130.

Figures 2, 3:
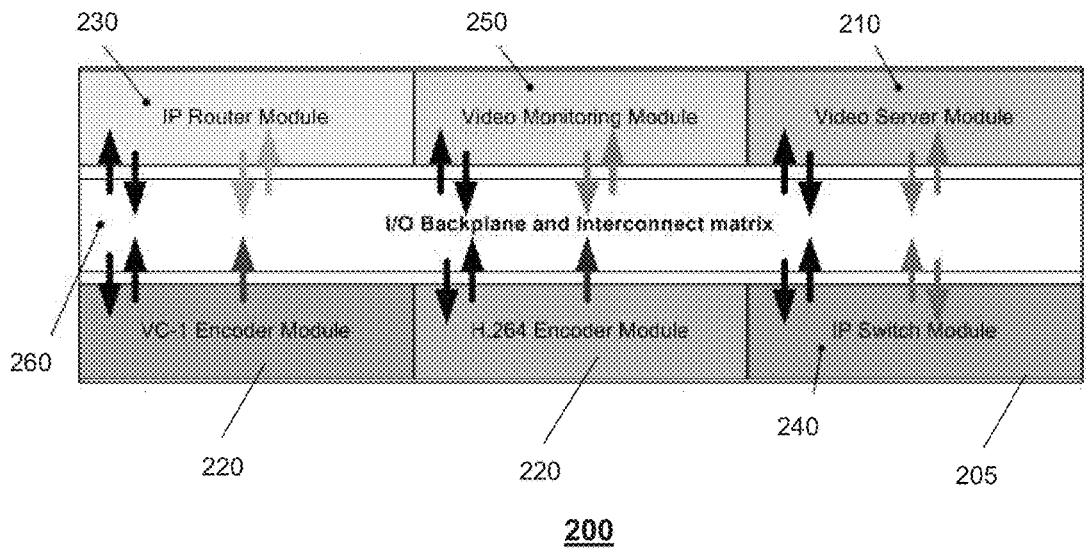
FIGS. 2 and 3 depict illustrative embodiments of network devices utilized in the communication system of FIG. 1.

FIG. 2 depicts an illustrative embodiment of a media distribution device 200 for delivering media content. One or more components of device 200 can be incorporated into media distribution device 130. Device 200 can include a modular chassis 205 that allows for removable connection of various components, modules or servers with the device. The particular connection structure used to provide for the removable connection as well as allow for communication between the various components can vary and can include an interconnect matrix. In one embodiment, the connection structure can be an I/O backplane 260 that provides for connectivity with each module for I/O and management connections. The I/O connections can vary, and can include SDI/HD-SDI/ASI, Ethernet and/or physical electrical connections. In one embodiment, the connection structure can provide for slideable mounting of the modules into the chassis so that the module is in communication with the other modules and is operable once slid into the chassis 205.

The device 200 can include a video server module 210 removably connectable with the chassis 205 for storage and distribution of static content. For example, the media content can be loaded via physical media storage or over network connectivity. A plurality of encoder modules 220 can be removably connectable with the chassis 205 for converting traditional video connections to encoded video for transportation over an IP network infrastructure. In one embodiment, ports can be provided for monitoring the video signal, such as through a monitor/passthru port. The video encoder modules 220 can encode the media content into various formats, including VC-1 and H.264.

In one embodiment, one or more of the video encoder modules 220 can be used for generating one or more lower profile versions of a main profile of the media content. The encoders 220 can embed code in the multiplex to develop lower profile copies. In one embodiment, the lower profile copies have lower resolution and higher error correction data, such as more FEC symbols in the data stream. In another embodiment, the main profile of the media content can be generated in MPEG-2 format while the lower profiles can be generated in H.264 and/or VC-1 format. The particular number of lower profile versions of the media content and the particular resolution and/or amount of error correction data can vary. In another embodiment, video scaling techniques can be employed so that the lower profile versions of the media content do not have a direct correlation to the MPEG-2 format of the main profile.

The device 200 can include an IP router module 230 that is removably connectable with the chassis 205. The IP router module 230 provides for connectivity to IP transport links, as well as out of band access for management of the chassis 205 and/or the other modules. The device 200 can include an IP switch module 240 that is removably connectable with the chassis 205. The IP switch module 240 can provide for connectivity to external Ethernet/IP hosts. This can allow for network connectivity to the modules as well. The device 200 can include a video monitoring module 250 that is removably connectable with the chassis 205. The video monitoring module 250 can monitor video quality and/or perform transport stream analysis. Various techniques can be utilized for the monitoring.

In one embodiment, the various modules can be replaced based on the desired distribution. For example, if the media content is intended only for distribution to hand held media devices then encoders 220 can be removably connected to the chassis 205 to provide for EVSB (Enhanced Vestigial Sideband modulation) encoding. For instance, signal processing can be applied by the encoders 220 according to an Advanced Television Systems Committee standard (ATSC), such as the mobile handheld standard, so that code is embedded in the multiplex which develops lower profile versions of the main profile. In one embodiment, the standard can be based on or related to the ATSC Recommended Practice: E-VSB Implementation Guidelines, document ATSC A/112, which is the ATSC standards related to E-VSB, and provides guidelines to parameter selection and implementation scenarios; the disclosure of which is incorporated herein by reference.

In another example, if the media content is intended for a broad distribution over various types of networks then encoders 220 can be removably connected to the chassis 205 which support each of those formats. Device 200 also allows for the modules to be easily replaced when an upgrade is available or when a failure has occurred. As another example, if a producer wants to distribute a single program via an IP network a set of modules that can be tailored to the producer's current needs can be deployed. If later that same producer wishes to increase the content that will be sent via IP transport a simple module change can facilitate the increase in encoder processors and network bandwidth via module interfaces.

FIG. 3 depicts an illustrative embodiment of a media distribution device 300 for delivering media content. One or more components of devices 130 and 200 can be incorporated into media distribution device 300. Device 300 can include the modular chassis 205 that allows for removable connection of various components, modules or servers with the device. The device 300 can include an IP router module, a video monitoring module, a video server module, an IP switch module and a plurality of video encoder modules which allow for distribution of a plurality of media contents over an IP network to various recipients (such as a central office, VHO and so forth). The device 300 can also include a network module, a content switch module, and A/D encoder module, a video synchronization module, an audio encoder module, an A/V test pattern module and/or a traffic module.

Figure 4:
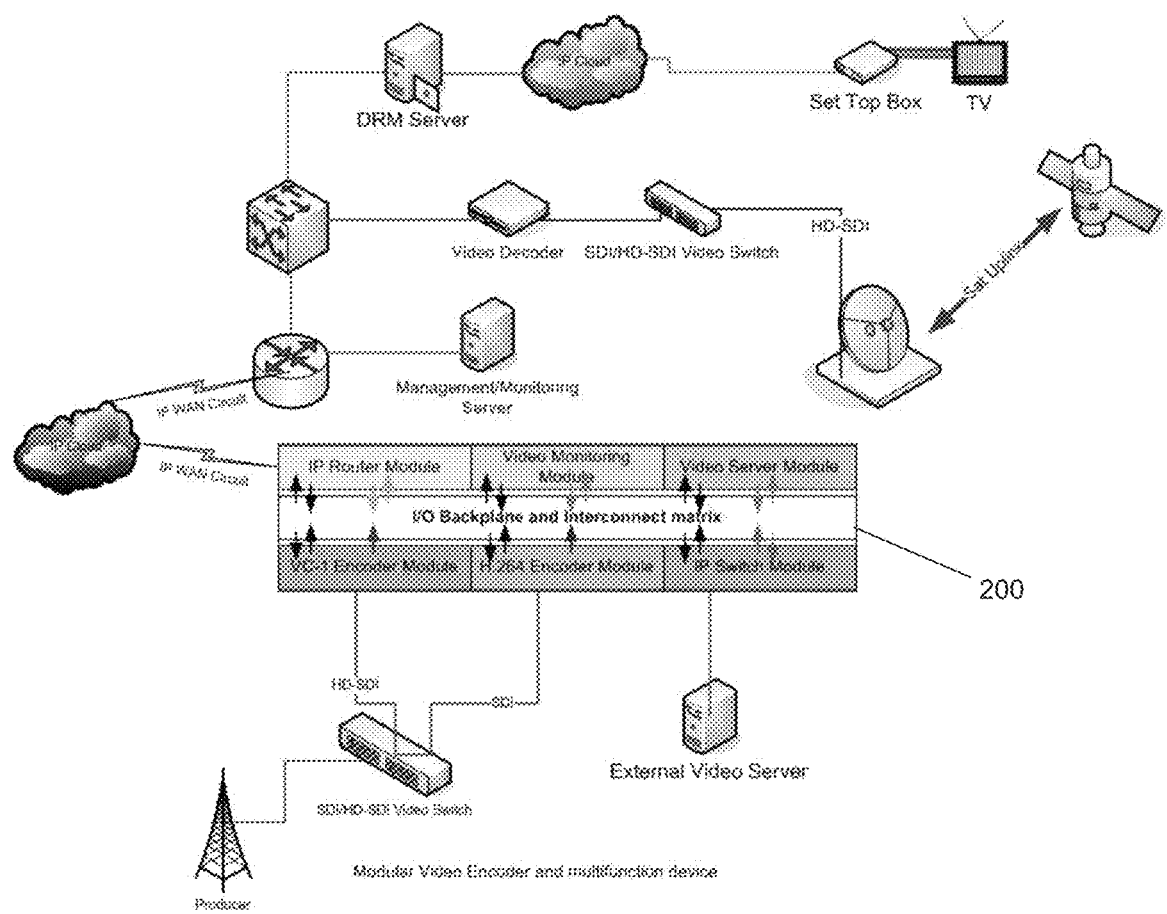
FIG. 4 depicts an illustrative embodiment of a communication system that provides media services and can utilize the network devices of FIGS. 2 and 3.

FIG. 4 depicts an illustrative embodiment of a communication system 400 having media distribution device 200 positioned therein. The device 200 can distribute different formats of the media content to various recipients, such as the set top box over the IP network and DRM server, as well as via satellite and so forth. The use of media distribution device 200 allows for real time distribution of the media content upon capture from the media event.

Device 200 allows use of an existing IP network to transport video content through out the world using dynamic routing protocols. Device 200 can provide both real time video content as well as static disk based content with the use of a single unit. Operational efficiencies can be achieved due to having only to manage one device.

Figure 5:
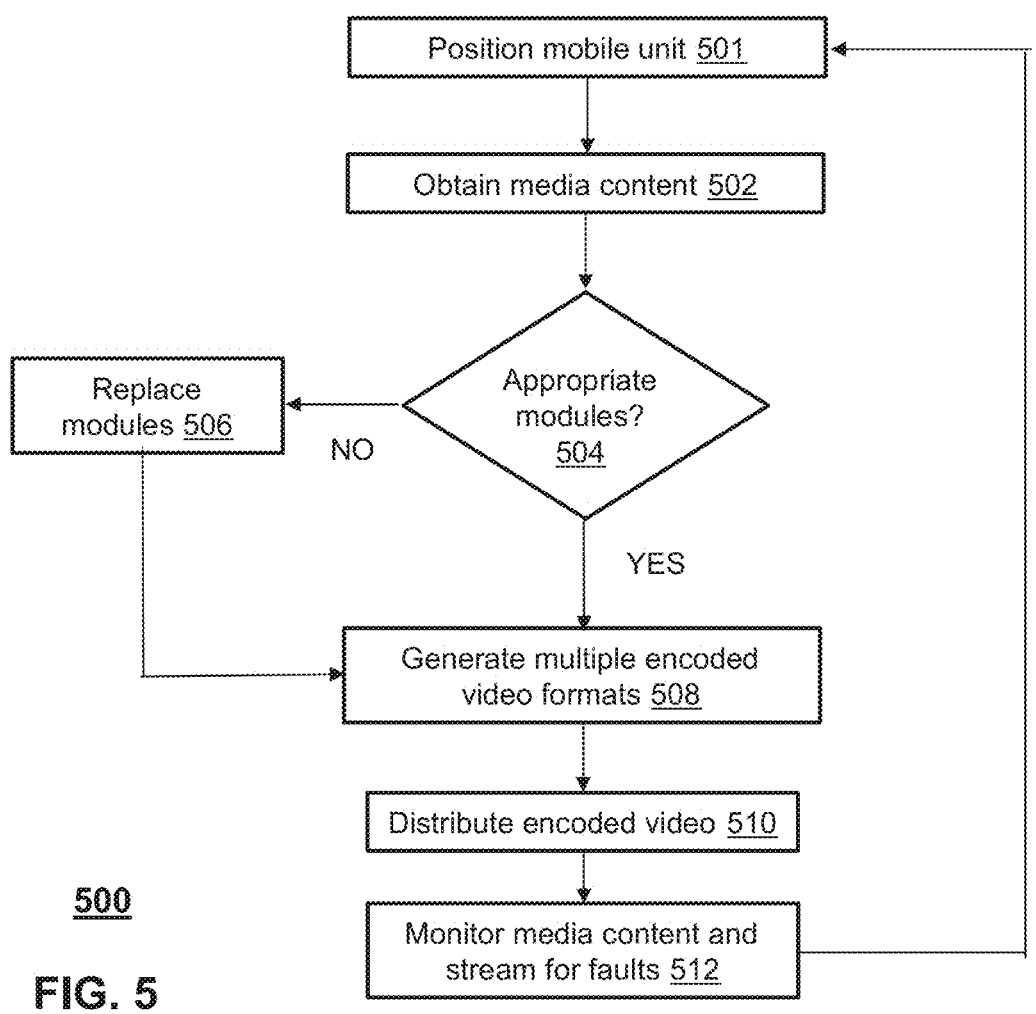
FIG. 5 depicts an illustrative embodiment of a method operating in portions of the communication systems of FIGS. 1 and 4.

FIG. 5 depicts an illustrative method 500 that operates in portions of the communication systems of FIGS. 1 and 4. Method 500 can begin with step 501 in which the mobile distribution device 200 is positioned in proximity to the media event. In step 502, the media content can be captured and then provided to the device 200, such as through the video server module 210. In step 504, it can be determined whether the desired modules are in place in the device 200, such as by determining the network destinations and/or the media formats most compatible with those destination or with transport to those destinations. This determination can be made by the technicians and/or can be made by the device 200. For instance, the device 200 can have an interface (not shown) for receiving information as to the media destinations. Based on this information, the device 200 can present the types of modules that should be placed in the chassis 205.

If the desired modules are not positioned in the chassis 205 then in step 506 the desired modules can be positioned therein including being placed in communication with one or more of the other modules so that the distribution of the media content can be implemented. In step 508, the desired video formats can be generated using a plurality of video encoders 220. The particular number of formats and the type can vary based on a number of factors, such as the desired destination of the media content.

In step 510, the IP router module can route the plurality of media contents to their desired destinations over an IP network infrastructure. The distribution device 200 can be removably coupled to the IP network using various connection devices and/or wireless interfaces. The particular routing scheme and techniques can vary. For example, the plurality of media contents can be bundled together and routed to a single destination where the media contents are then separated and further distributed. In another embodiment, the various distinct formats of the media content can be separately distributed over the IP network to various different locations, such as a central office for broadcast to set top boxes and to a VHO for broadcast over an IPTV network infrastructure, including via satellite.

In step 512, the video quality and/or the transport stream can be monitored for faults and corrections can be applied, such as through module 250. In one embodiment, the module 250 can determine if the link, such as the PID lock, is in jeopardy of being lost or otherwise losing synchronization or continuity of the video. If the link is in jeopardy then the module 230 can provide the viewers with a lower profile version of the media content which has a lower resolution but higher error correction data in order to maintain the link. The particular error correction technique utilized can vary and can include FEC, such as block coding, convolution coding, concatenate coding, turbo coding and so forth. The above-described switching to lower profiles to be transmitted can be performed at the device 200 and/or at an intermediary server, such as at a VHO. The link being monitored can be with the viewer's media device, such as a hand held device, and/or can be with a provider distribution device, such as at the VHO.

In one embodiment, the device 200 can determine which of a group of lower profile versions of the media content should be distributed. The various lower profile versions can be stored by the device, such as at video server module 210. The determination can be based on a number of factors, including the amount of faults and/or the type of faults detected which jeopardize the video continuity.

Upon reviewing the aforementioned embodiments, it would be evident to an artisan with ordinary skill in the art that said embodiments can be modified, reduced, or enhanced without departing from the scope and spirit of the claims described below. For example, the video server module 210 can be the controller for the device 200. Control signals from the module 210 can be sent to the various other modules to actuate their respective functions, such as commencing the encoding and routing the plurality of media contents over the IP network infrastructure. The module 210 can be in a master-slave relationship with the other modules, although other control relationships are also contemplated.

In one embodiment, a separate controller can be utilized to implement each of the functions of the modules of device 200.

In another embodiment, the device 200 can receive feedback, such as through monitoring being performed at intermediary provider offices such as the central office and VHO. Based on the feedback, the device 200 can make adjustments to the plurality of media contents and/or the video transport stream, including adjusting FEC data in one or more of the media content streams, adjusting the resolution, and so forth. The present disclosure also contemplates the media distribution device 200 receiving the media content from various other sources, including over the network infrastructure or from a storage medium.

Other suitable modifications can be applied to the present disclosure without departing from the scope of the claims below. Accordingly, the reader is directed to the claims section for a fuller understanding of the breadth and scope of the present disclosure.

Figure 6:
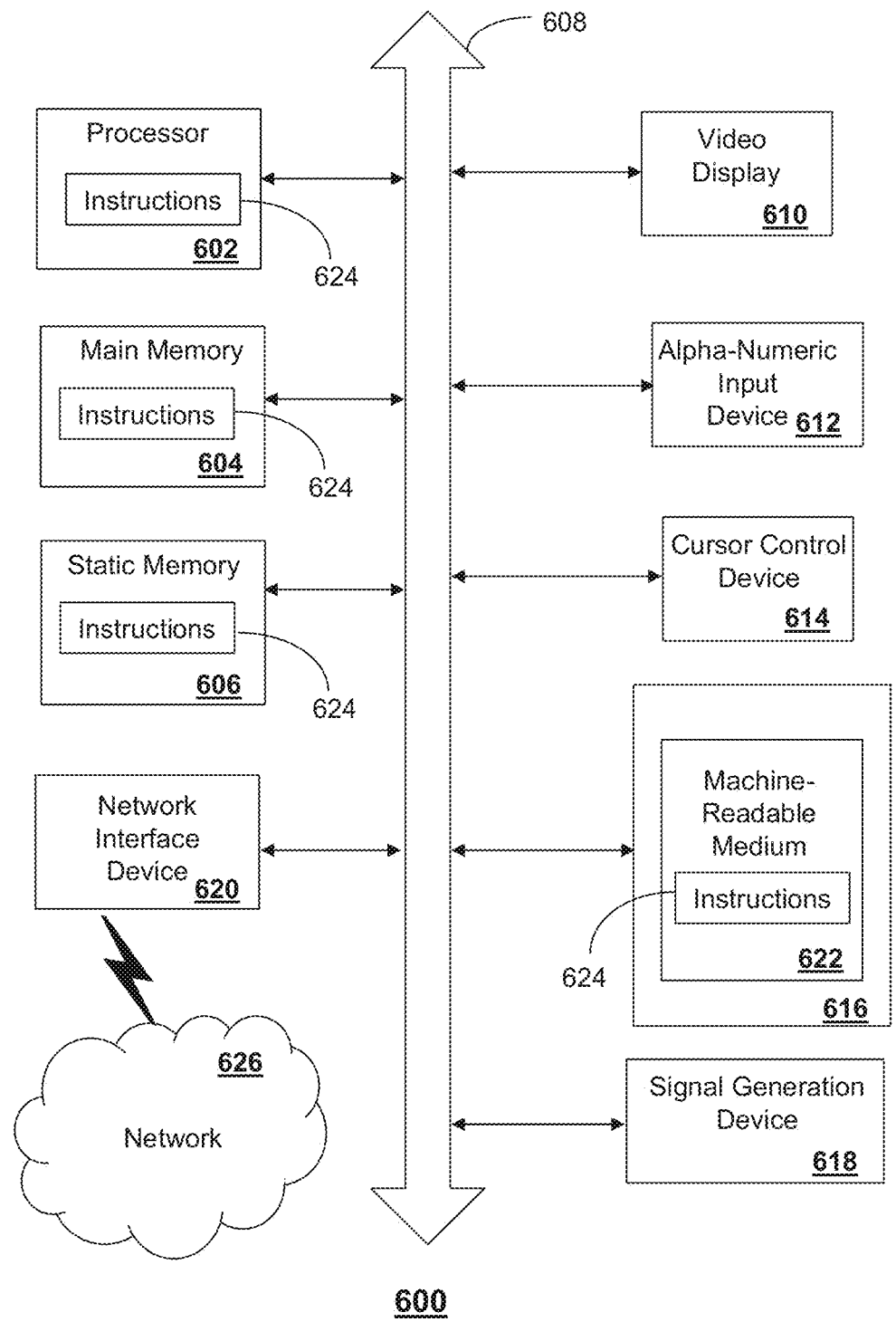
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions that, when executed by a processing system including a processor, facilitate performance of operations, comprising:

receiving media content at a video server of a mobile distribution device;

identifying a communication device for presenting the media content and a media content format compatible with the communication device;

configuring a video encoder of the mobile distribution device based on the media content format;

directing the video encoder to generate first encoded media content and second encoded media content based on the media content and the media content format, wherein the first encoded media content comprises first error correction data and the second encoded media content comprises second error correction data, wherein the second encoded media content is generated via video scaling of the media content;

directing a network router of the mobile distribution device to distribute the first encoded media content over a network to a plurality of recipient devices;

directing a monitoring module of the mobile distribution device to monitor feedback data from a network device associated with the first encoded media content that is distributed via the network router; and directing the network router to select the second encoded media content responsive to the feedback data that is monitored, wherein the video server, the video encoder, the network router and the monitoring module comprise modules removably connectable with a chassis and interconnected according to an interconnect matrix, wherein the first encoded media content is distributed to first and second recipient devices of the plurality of recipient devices via a first link and a second link, respectively, and wherein responsive to the feedback data indicating a likelihood of loss of the second link, the network router distributes the first encoded media content via the first link and the second encoded media content via the second link, thereby maintaining the second link.

2. The non-transitory machine-readable storage medium of claim 1, wherein the media content is captured in near proximity to the mobile distribution device.

3. The non-transitory machine-readable storage medium of claim 1, wherein the first encoded media content comprises a first video format and the second encoded media content comprises a second video format.

4. The non-transitory machine-readable storage medium of claim 3, wherein a first video format comprises a first resolution of the media content and a first set of error correction data and wherein the second video format comprises a second resolution of the media content and a second set of error correction data.

5. The non-transitory machine-readable storage medium of claim 1, wherein the operations further comprise storing the media content that is received at a server module of the mobile distribution device.

6. The non-transitory machine-readable storage medium of claim 1, wherein the network device is located at a video head end office.

7. The non-transitory machine-readable storage medium of claim 1, wherein the feedback data comprises video quality.

8. The non-transitory machine-readable storage medium of claim 1, wherein the feedback data comprises information associated with faults associated with the first encoded media content that is distributed via the network router.

9. The non-transitory machine-readable storage medium of claim 1, wherein the feedback data comprises information associated with corrections associated with the first encoded media content that is distributed via the network router.

10. The non-transitory machine-readable storage medium of claim 1, wherein the first encoded media content is distributed by the network router to a central office for broadcast to a plurality of set-top boxes.

11. The non-transitory machine-readable storage medium of claim 1, wherein the operations further comprise directing the network router to adjust a characteristic of a video transport stream for distributing the second encoded media content.

12. The non-transitory machine-readable storage medium of claim 1, wherein the operations further comprise directing the video encoder to adjust a resolution of one of the first encoded media content or the second encoded media content responsive to the feedback data that is monitored.

13. The non-transitory machine-readable storage medium of claim 1, wherein transmission of the first encoded media content at a communication link between the network and the communication device of a subscriber is monitored via the network device.

14. A router device, comprising:
a processing system including a processor; and
a memory that stores executable instructions that, when executed by the processor, facilitate performance of operations, comprising:
receiving first encoded media content from a video encoder of a mobile distribution device, wherein the first encoded media content is generated according to media content that is received at a video server of the mobile distribution device;
distributing the first encoded media content over a network to a plurality of recipient devices;
receiving an instruction to switch to second encoded media content generated according to the media content responsive to feedback data associated with the distributing of the first encoded media content, wherein the second encoded media content is generated via video scaling of the media content, and wherein the feedback data is monitored by a monitoring module of the mobile distribution device; and
distributing the second encoded media content over the network, wherein the first and second encoded media content is encoded based on capabilities of a communication device to display the media content and a media content format compatible with the communication device, wherein the video server, the video encoder, the router device and the monitoring module comprise modules removably connectable with a chassis and interconnected according to an interconnect matrix, and wherein the first encoded media content is distributed to first and second recipient devices of the plurality of recipient devices via a first link and a second link respectively; and
responsive to the feedback data indicating a likelihood of loss of the second link, distributing the first encoded media content via the first link and the second encoded media content via the second link, thereby maintaining the second link.

15. The router device of claim 14, wherein the first encoded media content comprises a first video format and the second encoded media content comprises a second video format.

16. The router device of claim 15, wherein a first video format comprises a first resolution of the media content and a first set of error correction data and wherein the second video format comprises a second resolution of the media content and a second set of error correction data.

17. The router device of claim 14, wherein the operations further comprise:
receiving an instruction to adjust a characteristic of a video transport stream responsive to the feedback data that is monitored; and
distributing the second encoded media content over the network according to the characteristic that is adjusted.

18. A method, comprising:
identifying, by a processing system including a processor, capabilities of a terminal device for displaying media content and a media content format compatible with the terminal device, the processing system comprising a mobile distribution device, the media content captured using a video server of the mobile distribution device;
selecting, by the processing system, a video encoder of the mobile distribution device based on the capabilities of the terminal device and the media content format;
encoding, by the processing system using the selected video encoder, the media content into a first encoded stream comprising first error correction information and a second encoded stream comprising second error correction information, wherein the second encoded stream is generated via video scaling of the media content;
transmitting, by the processing system using a network router of the mobile distribution device, the first encoded stream to a communication device via a network;
monitoring, by the processing system using a monitoring module of the mobile distribution device, quality feedback data associated with the transmitting of the first encoded stream; and
transmitting, by the processing system, the second encoded stream to the communication device according to the quality feedback data, wherein the video server, the video encoder, the network router and the monitoring module comprise modules removably connectable with a chassis and interconnected according to an interconnect matrix, and wherein the first encoded stream is distributed to first and second recipient devices of a plurality of recipient devices via a first link and a second link respectively; and
responsive to the feedback data indicating a likelihood of loss of the second link, distributing, by the processing system using the network router, the first encoded stream via the first link and the second encoded stream via the second link, thereby maintaining the second link.

19. The method of claim 18, wherein the video server comprises a video capturing device that is in near proximity to the mobile distribution device.

20. The method of claim 18, wherein the first encoded stream comprises a first video resolution and the second encoded stream comprises a second video resolution.

* * * * *